Sept. 9, 1952 W. C. BOYCE 2,610,006
RUDDER PEDAL INSTALLATION
Filed Nov. 18, 1950 5 Sheets-Sheet 1

INVENTOR.
William C. Boyce
BY
Attorney

INVENTOR.
William C. Boyce
Attorney

Sept. 9, 1952 W. C. BOYCE 2,610,006
RUDDER PEDAL INSTALLATION
Filed Nov. 18, 1950 5 Sheets-Sheet 4

INVENTOR.
William C. Boyce
BY
Attorney

Sept. 9, 1952  W. C. BOYCE  2,610,006
RUDDER PEDAL INSTALLATION
Filed Nov. 18, 1950  5 Sheets-Sheet 5
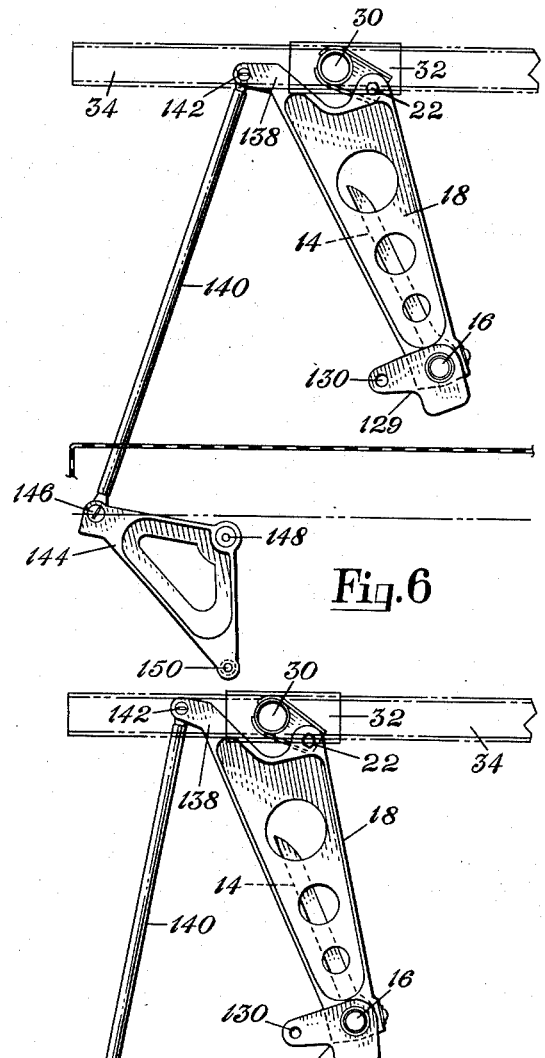
INVENTOR.
William C. Boyce
BY
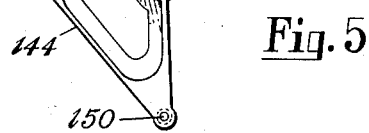
Attorney Patented Sept. 9, 1952

2,610,006

UNITED STATES PATENT OFFICE 2,610,006

RUDDER PEDAL INSTALLATION

William C. Boyce, Dallas, Tex., assignor to United Aircraft Corporation, East Hartford, Conn., a corporation of Delaware Application November 18, 1950, Serial No. 196,413

7 Claims. (Cl. 244—86)

This invention relates to aircraft and particularly to devices for adjusting the pedals of pedal actuated systems in aircraft such as the rudder and brake systems.

Rudder and brake systems in aircraft are normally controlled by means of pressure applied to pedals by the pilot's feet. These pedals have heretofore been so attached to the aircraft structure as to make any adjustment in their location by the pilot difficult and so as to make any material adjustment in their location virtually impossible. It is apparent that a means of effecting a material adjustment in the location of the pedals in a simple and easy operation is highly desirable in order to accommodate pilots having varying proportion in physical structure and to iad in retarding or preventing muscular fatigue of the pilots.

This invention comprises a novel system of slides, links, springs, and other mechanical apparatus, providing a device for easily and readily adjusting the location of the pedals of pedal controlled systems.

It is an object of this invention to provide a means of adjusting the location of pedals in pedal controlled systems in aircraft to accommodate pilots of different physical structure and proportions.

Another object of this invention is to provide a pedal adjustment device with an easy and simple mode of operation.

A further object of this invention is to provide a pedal adjustment system which is operable in flight.

It is a still further object of this invention to provide a means of effecting a simultaneous and equal adjustment of the positions of both pedals in response to foot pressure on the pedals.

It is yet a further object of this invention to provide a means of adjustment for pedals responsive to the movement of a knob, lever, or handle.

Other objects and advantages will be apparent from the specifications and claims, and from the accompanying drawings which illustrate an embodiment of the invention.

Briefly, this mechanism consists of a pair of pedals which is connected to the rudder and brake systems of an aircraft and also pivotally connected to a traversing shaft rigidly secured to a pair of slides which ride on opposed tracks. Manual release of a locking device causes a spring, working through a pair of pivotally-mounted, biased sector wheels and links, to smoothly exert pressure on the shaft, urging it aft along the tracks. In the unlocked condition of the mechanism, the pilot may adjust the pedals to the desired position by foot pressure on the pedals and manually lock the mechanism to secure the pedals in the desired position.

Fig. 1 in the accompanying drawings, is a perspective view of the rudder and brake pedal installation showing the pedal adjusting mechanism and its general location in the cockpit of an airplane;

Fig. 5 is a side elevational view along line V—V in Fig. 4 of the pedal control mechanism in the forward position; and Fig. 6 is a side elevational view similar to Fig. 5 of the pedal control mechanism in the aft position.

Figure 1:
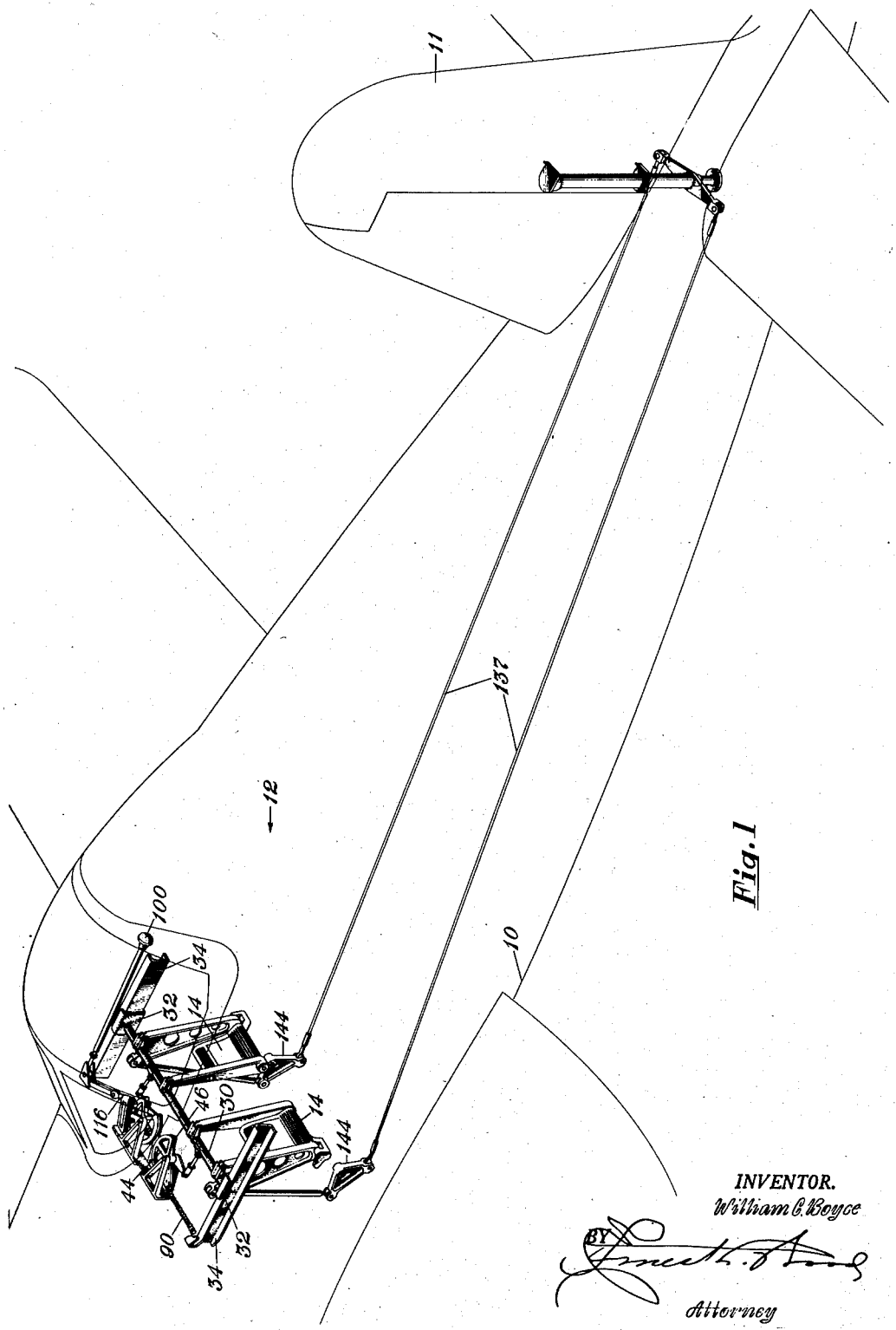

In Fig. 1 of the drawings the numeral 10 indicates an airplane having a rudder 11 and generally indicated at 12 is the pedal control adjusting mechanism of this invention.

Inasmuch as the pedals are operated alike and inasmuch as the construction of the two pedals is the same except for the right and left hand characteristics of their members, for clarity in description only, one set of numbers will be used to designate the corresponding components of both pedal mechanisms.

Figure 2:
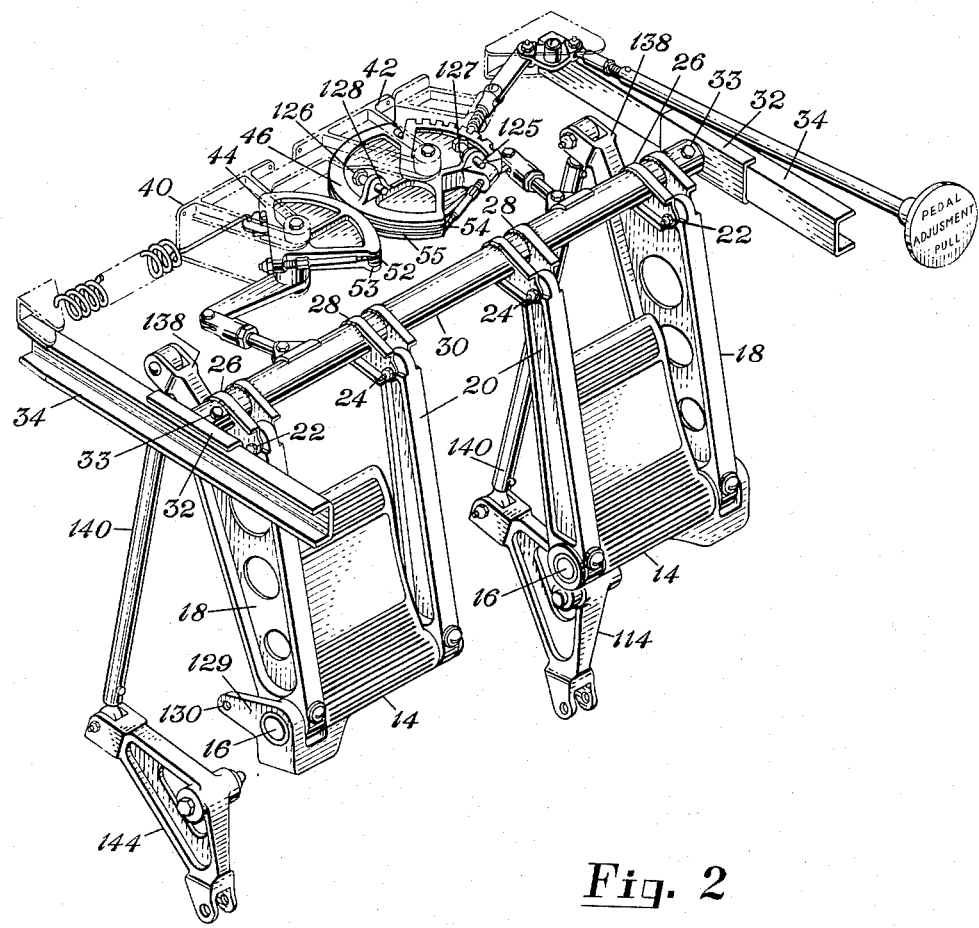
Fig. 2 is a perspective view of the pedal control installation and adjusting mechanism on a larger scale.

Referring now to Fig. 2, the pedal control mechanism 12 consists of a rudder pedal 14 rotatably journalled on axle 16 which is rigidly secured to the lower extremities of arms 18 and 20. Arms 18 and 20 are pivoted, at their upper portions, on pins 22 and 24 respectively, said pins being inserted through bifurcated brackets 26 and 28 which are rigidly secured, for example by welding, to a slidable supporting shaft 30. In order to permit fore and aft adjustment of the rudder pedals, slides 32 are firmly and rigidly secured to the shaft 30 at each of its extremities by bolts 33. The slides 32 are channel shaped parts designed to fit snugly on channeled tracks 34 which latter are rigidly secured in any suitable manner to fuselage frame members of the aircraft. Slides 32 are arranged on tracks 34 in such a manner as to allow free fore and aft travel thereof along tracks 34.

Figure 3:
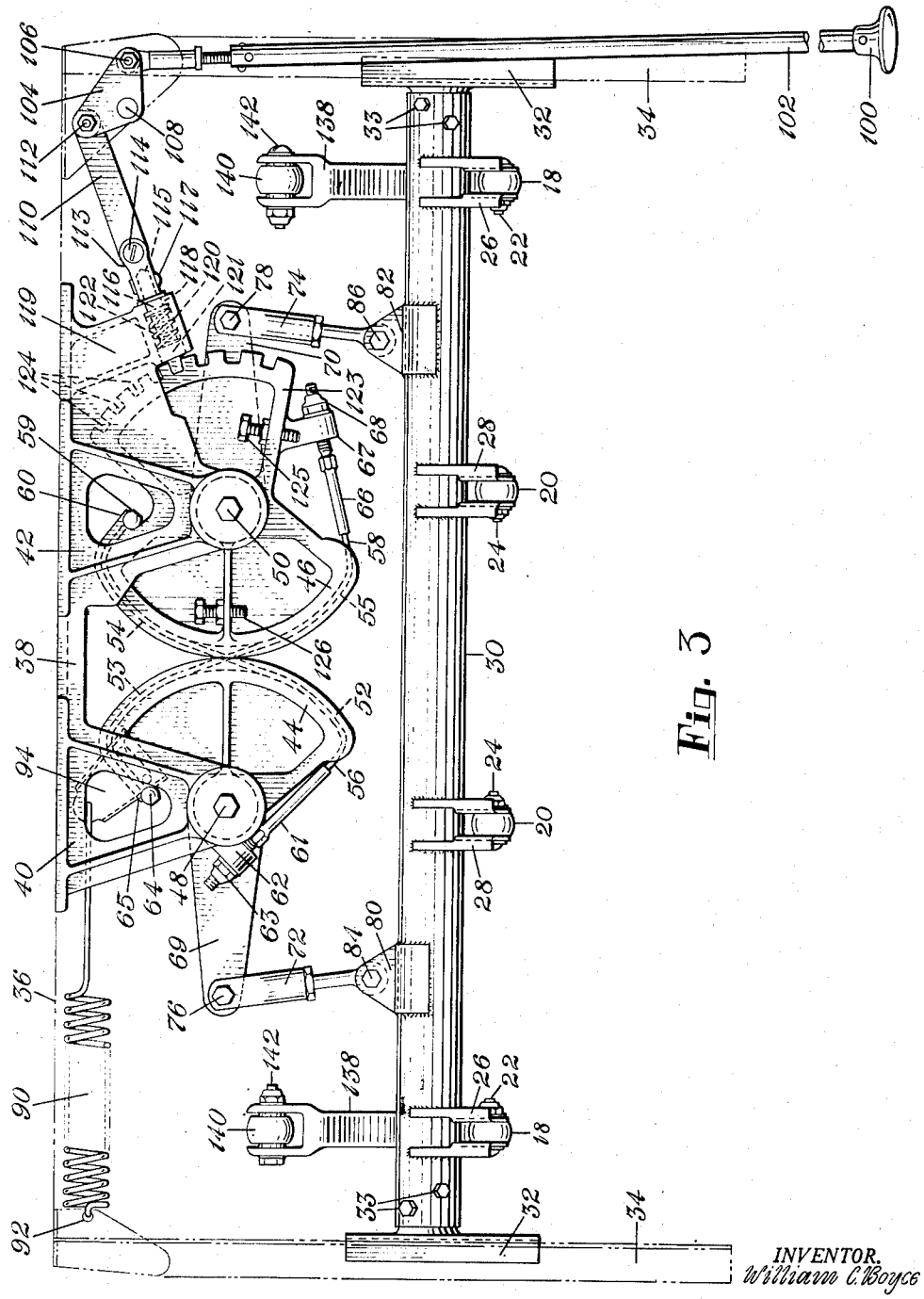
Fig. 3 is a plan view on a still larger scale showing the pedal control adjusting mechanism when the pedals are in a neutral position.

Referring to Fig. 3, which shows a plan view of the adjusting mechanism of this invention, there is attached to suitable aircraft structure, such as a bulkhead 36, a cast member 38. Member 38 is firmly and rigidly secured to structure 36 and has two bifurcated protrusions or arms 40 and 42 extending aft in a horizontal plane. Sector wheels 44 and 46 are positioned between the bifurcations of arms 40 and 42 respectively and are pivotally secured thereto by shafts 48 and 50.

The sectors of wheels 44 and 46 are placed in contiguous relationship. The sector wheel 44 has two peripheral grooves, an upper groove 52 and a lower groove 53, while sector wheel 46 has two similar peripheral grooves with groove 54 being the upper and groove 55 being the lower. The sector wheels 44 and 46 have coincident inverse movement by means of crossed cables 56 and 58 which run in the said peripheral grooves of sectors 44 and 46. One end of cable 56 is secured by means of a swaged ball terminal 59 which is fitted within ball socket 60 sunken in the periphery of sector wheel 46. Cable 56 runs part way along groove 54 of sector 46 from ball and socket 59 and 60, then crosses and runs in groove 52 of sector 44 where it terminates in the swaged threaded terminal 61. Terminal 61 extends through an aperture in a horizontally extended portion 62 of wheel 44 and is there secured by nut 63. When nut 63 is tightened it tends to pull terminal 61 through the aperture of portion 62 thereby tending to draw cable 56 taut in the peripheral grooves 52 and 54. Cable 58 is secured in the same manner as cable 56 by a swaged ball terminal 64 fitting within ball socket 65 of wheel 44. Cable 58 runs part way along the groove 53 of sector 44 then crosses and runs in groove 55 of sector 46 and ends in a swaged threaded terminal 66 which latter extends through portion 67 of wheel 46 and is secured thereto by nut 68.

To connect with movable shaft 30 and to transmit motion thereto, sectors 44 and 46 have integral portions or rigidly secured arms 69 and 70 respectively. To the extremities of these generally outwardly directed arms 69 and 70 are pivotally secured links 72 and 74 by pins 76 and 78 extending through bifurcated ears of links 72 and 74. The aft ends of these links are pivotally secured between bifurcated ears of brackets 80 and 82 by pins 84 and 86, respectively. Brackets 80 and 82 are rigidly attached, as by welding, to the slidable shaft 30. Appropriate cooperative adjustment of nuts 63 and 68 on fittings 61 and 66 respectively will provide for exact arcuate positioning of arms 69 and 70.

The shaft 30 carrying pedals 14 is biased towards an aft position by tension spring 90. One end of spring 90 is secured to aircraft structure at point 92. The other end of spring 90 is fastened to a protruding bracket 94 which is rigidly secured to sector 44. It can thus be seen that the spring 90 imparts to sectors 44 and 46 a rotary motion in such a manner as to move arms 69 and 70 simultaneously in an aft direction. As arms 69 and 70 move aft, links 72 and 74 move aft and thereby cause shaft 30 secured to slides 32 to move aft on tracks 34.

By the wide spacing of links 72 and 74 which connect to slidable shaft 30 and by insuring simultaneous movement of arms 69 and 70 through the action of the crossed cables 56 and 58 on sectors 44 and 46, forward and aft movements of shaft 30 are smooth, and binding or bucking of the shaft 30 is eliminated because the slides 32 thereby tend to stay in exact parallel relationship to tracks 34.

Figure 4:
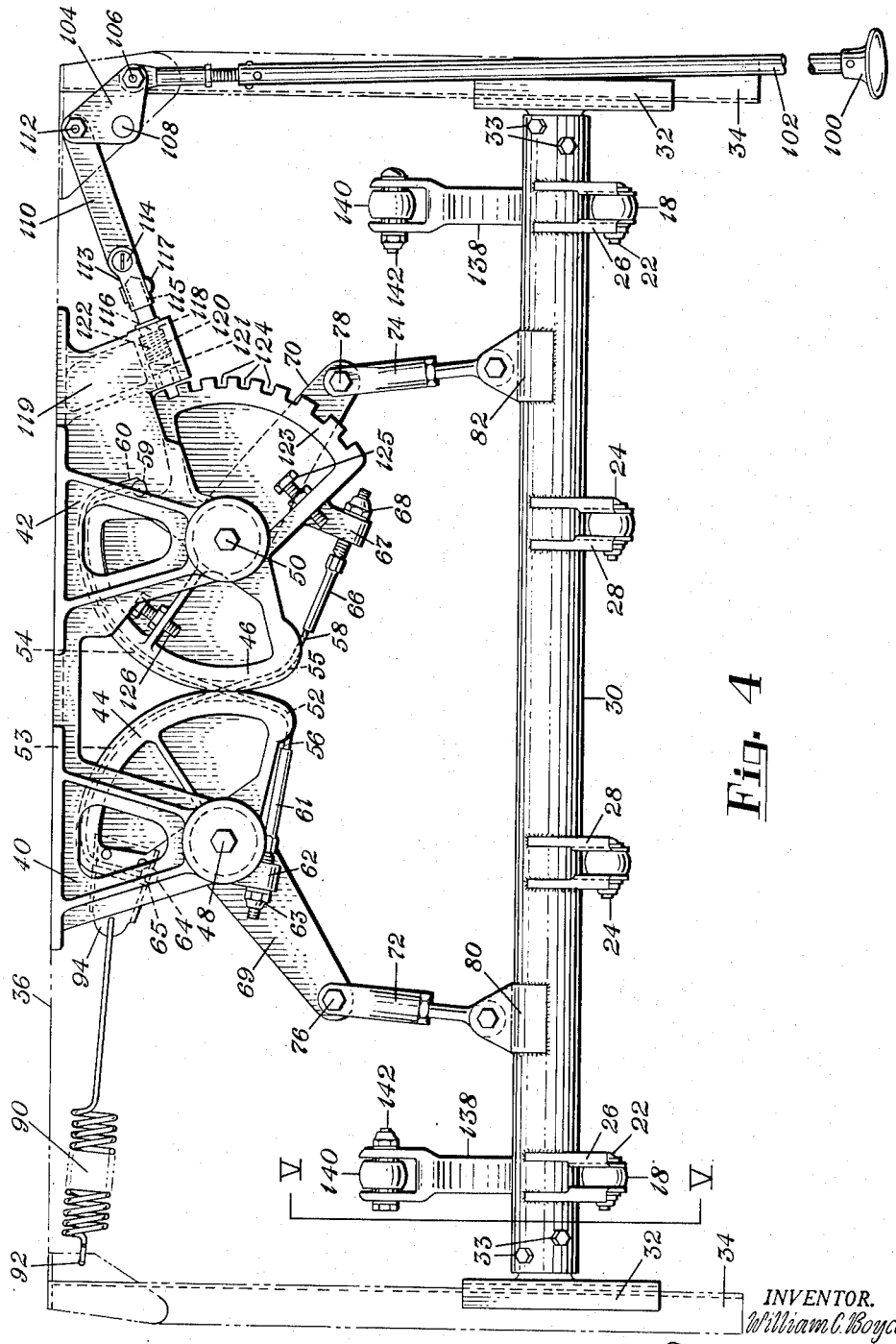
Fig. 4 is a plan view similar to Fig. 3 showing the pedal controls in the extreme aft position.

The pilot prepares to adjust the position of the pedals by pulling the pedal adjustment knob 100. It is to be understood that a lever or handle may be used in place of a knob as described in the instant example. Knob 100 is rigidly attached to one end of link 102 extending into the cockpit of the airplane. The other end of link 102 is pivotally attached to a bellcrank 104 by means of a pin 106 through a bifurcated portion of the bellcrank 104. Bellcrank 104 is pivoted on a shaft 108 secured to aircraft structure and a link 110 is pivotally attached at one end by a pin 112 through a bifurcated portion of bellcrank 104. Link 110 is pivotally secured at its opposite end to one end of a link 113 by a pin 114 extending through the apertures and bifurcated end of link 113. The other end of link 113 has a cylindrical recess 115 in which one end of spring loaded plunger 116 is rigidly secured by a pin 117. Plunger 116 moves through an aperture 118 in a bracket 119 which latter is rigidly secured to bulkhead 36 and supports plunger 116. Aperture 118 has an enlarged portion 120 in which a flanged portion 121 of plunger 116 moves. A compression spring 122 is disposed in the enlarged portion 120 of aperture 118 through which plunger 116 extends and one end of the spring 122 is placed in contact with the flanged portion 121 of plunger 116 while the other end of spring 122 rests against the outboard shoulder of the enlarged portion 120 of aperture 118. Spring 122 is thereby kept in a state of compression, being fully compressed when the pedal adjustment knob 100 is pulled. Sector wheel 46 has an extended arcuate portion 123 opposite its grooved sector portion which has along its outer periphery a plurality of recesses or notches 124. Plunger 116 can engage any of the several notches 124 on sector wheel 46, thereby allowing any of several adjusting positions. The compression spring 122 continually exerts pressure on the flange 121 of plunger 116 thereby resisting disengagement of plunger 116 from a selected one of the plurality of notches 124. When the pilot pulls on knob 100 the plunger 116 is disengaged from one of the notches 124, for example, when in the position shown in Fig. 3, and the spring 90 biases the entire assembly in an aft direction, thereby urging the assembly towards the position shown in Fig. 4. After the knob 100 is pulled, the pilot can, by exerting foot pressure on the pedals, move the pedals forward to a desired position. When the desired position of the pedals is reached, the pilot may there, by releasing the knob 100, cause the plunger 116 to engage one of the notches 124 in the toothed portion 123 of sector 46 thus locking the pedals.

There are two set screws 125 and 126 engaged in threaded apertures in ears 127 and 128 which extend up vertically from sector wheel 46 as shown in Fig. 2. These set screws are brought up against the upper part of bifurcated arm 42 of bracket 38 when sector wheel 46 is rotated to the extreme right or left. These two set screws can be adjusted to predetermine the actual angular rotational displacement of the sector wheels 44 and 46.

Referring now to Figs. 5 and 6, pedal 14 can be rotated about the axis of axle 16 to move an arm 129 in the conventional manner. Arm 129 is connected at an aperture 130 to the brake mechanism of the aircraft which consists of pressure cylinders, pressure transmitting lines, and other apparatus and which mechanism, also being conventional, is not shown. Arm 129 is connected to the brake mechanism of the aircraft in order that the wheel brakes can be actuated by rotation of pedal 14 about the axis of axle 16. The braking mechanism may be attached by pivotable links or flexible hydraulic lines so as to leave the pedals and shaft 30 freely movable.

When it is desired to move the rudder surface of the aircraft, the pilot rotates pedal 14 about pivots 22 and 24, thereby affecting movements in the rudder 11 through a conventional cable arrangement 137 such as shown in Fig. 1. Arm 18 has a forwardly extending portion 138 to which a link 140 is connected by means of a pin 142 extending through the bifurcated end of portion 138 of arm 18. The other end of link 140 is connected to a bellcrank 144 by means of a pin 146 extending through a bifurcated portion of bellcrank 144. Bellcrank 144 pivots about a shaft 148 rigidly attached to the aircraft structure. A bifurcated portion of bellcrank 144 is connected by a pin 150 to the remainder of the above-mentioned rudder control mechanism 137. The means of transmitting rudder pedal forces to the rudder from point 150 can be of any suitable conventional design, since said remaining rudder control mechanism 137 does not constitute part of this invention.

The position of rudder 11 is easily controlled by forward pressure on the appropriate pedal. This causes arm 138 to rotate about the pins 22 and 24 exerting a pull on link 140 which is relayed to bellcrank 144 at point 146 as shown in Fig. 6. Such a pull at point 146 causes bellcrank 144 to pivot in a clockwise direction at point 148 thereby causing point 150 to which the rudder mechanism is attached to travel forward in an arc about point 148. This forward motion of point 150, when transmitted through a conventional rudder control mechanism 137, moves the rudder as desired and when relayed back through the bellcrank 144 mechanism of the other pedal, causes it to assume a correspondingly opposite position in regard to the pedal to which pressure was applied.

As the pedals and shaft 30 are moved forward or aft, the links 140 connecting with the rudder mechanism 137, being free to rotate at points 142 and 146, move in an arc about points 146 thereby maintaining the movability of said pedals and shaft longitudinally.

It can be noted in Figs. 5 and 6 that the actual pedal position with respect to a vertical reference line varies only a negligible amount so that the feel of the pedals to the pilot after longitudinal adjustment remains virtually the same.

It will be seen that this invention provides a simple mechanism whereby pedal controls may be moved through a wide range of longitudinal positions and can be locked or fixed in any of several predetermined positions. As a result of this invention, pilots may now adjust the location of the pedal controls of their aircraft in a quick, simple, and easy operation even while in flight. This enables the pilot to relieve muscular fatigue of his legs and provides a suitable distance to the pedals for pilots of any physical proportions.

While only one embodiment of the invention has been shown in the accompanying drawings, it will be evident that various modifications are possible in the arrangement and construction of the adjustable pedal control mechanism components without departing from the scope of the invention.

What it is desired to secure by Letters Patent is:

1. In an airplane having a rudder and rudder pedals controlling movement of said rudder, a rudder pedal adjustment mechanism comprising a pair of tracks rigidly secured to fixed structure of said airplane substantially parallel to the longitudinal axis of said airplane, a shaft transverse to said tracks and mounted thereon for sliding movement in relation thereto in fore and aft directions in said airplane, rudder pedals suspended from said shaft for pivotal movement, connecting means between said rudder and said pedals, means for biasing said shaft in one of said directions including a pair of spring-biased sector wheels mounted on fixed structure of said airplane operatively connected to said shaft and correlated for inverse simultaneous rotary movements, one of said sector wheels having a portion thereof having recesses therein, means for locking said sector wheels in preselected positions including plunger means for engaging said recesses, and manually operable means for disengaging said plunger from said recesses whereby said shaft may be moved along said tracks in either of said directions.

2. In an airplane having a rudder, a rudder control system comprising parallel, spaced apart tracks mounted on a stationary part of said airplane, a shaft mounted transversely between said tracks and having its ends supported thereby for fore and aft sliding movement thereon in said airplane, rudder pedals suspended from and rotatable in relation to said shaft, said rudder pedals being connected to said airplane rudder, a pair of spring-biased sector wheels mounted on fixed structure of said airplane adjacent said shaft, means for connecting said sector wheels for rotation in counter-directions, means effecting connection between said sector wheels and said shaft to impart movement to the latter when said sector wheels are rotated under tension of said spring biasing means of said sector wheels, means for locking said sector wheels against rotation and means for actuating said latter means.

3. In a rudder control system for aircraft, a pair of opposed tracks, a shaft extending between said tracks and having its ends slidably connected thereto, rudder pedals pivoted to and depending from said shaft, a pair of sector wheels mounted on fixed structure of said airplane each having an arm extending at right angles to its rotating axis, means movably connecting the ends of said arms to said shaft at spaced apart points thereon, means joining said sector wheels for simultaneous rotation in counter-directions to effect movement of said shaft through said arms and connecting means, spring means exerting a force tending to rotate said sector wheels to move said shaft in one direction, means for locking said sector wheels against rotation and means for actuating said locking means to release said sector wheels whereby the position of said shaft and said rudder pedals may be changed.

4. In an aircraft having a rudder, a rudder control system comprising, an elongated supporting member slidably mounted on fixed structure in said aircraft for movement substantially parallel to the fore and aft axis of said aircraft, said member being disposed substantially perpendicular to said axis; rudder pedals pivotally secured to said supporting member; means for moving said supporting member parallel to said axis comprising a pair of spring-biased sector wheels mounted on fixed structure of said airplane inter-connected for inverse, simultaneous, rotary motion, connecting means between said sector wheels and said supporting member, one of said sector wheels having a portion thereof provided with a plurality of recesses; and manually operable means adapted to engage selectively in said recesses to lock said wheels against rotation.

5. In an airplane having control surfaces, a spaced pair of tracks securely fixed to rigid structure of said airplane, a pair of slides each slidable upon one of said tracks, a shaft fixedly attached at each of its extremities to one of said slides thereby allowing movement of the shaft upon said tracks in a parallel direction with said tracks, a pair of pedals pivotally suspended from said shaft, means for connecting said pedals with said airplane control surfaces, a pair of sector wheels rotatably mounted to fixed structure of said aircraft, means for operatively connecting said wheels with said shaft, means for connecting the said sector wheels to each other to provide simultaneous inverse rotational motion between said wheels, means for rotatably biasing the said wheels, means for locking the said wheels in a selected position, and means for actuating said locking means.

6. In an airplane having a rudder, a rudder pedal adjustment mechanism comprising tracks fixedly attached to fixed structure of said airplane, a shaft mounted on said tracks for sliding movement in relation thereto, pedals suspended from said shaft for swinging movement, an operative connection between said pedals and said rudder, a pair of sector wheels mounted on fixed structure of said airplane, connecting means between said sector wheels for providing simultaneous inverse movement to said wheels, connecting means between said sector wheels and said shaft whereby said shaft is moved along said tracks upon rotation of said sector wheels and means for imparting rotation to said sector wheels.

7. In apparatus of the character described, a spaced pair of tracks mounted on fixed structure, a shaft transversing said tracks and slidably mounted thereon, a pair of inter-connected sector wheels mounted on fixed structure, biasing means for biasing said wheels rotatably, connecting means between said sector wheels and said shaft whereby rotational biasing of said wheels imparts linear motion to said shaft parallel with said tracks, means for locking and unlocking said sector wheels in selected positions, and means for actuating said locking and unlocking means.

WILLIAM C. BOYCE.

REFERENCES CITED

The following references are of record in the file of this patent:

UNITED STATES PATENTS

| Number | Name | Date |
| --- | --- | --- |
| 2,424,523 | Watter | July 22, 1947 |

FOREIGN PATENTS

| Number | Country | Date |
| --- | --- | --- |
| 255,619 | Great Britain | July 29, 1926 |